(12) United States Patent
Fuller

(10) Patent No.: US 7,197,485 B2
(45) Date of Patent: Mar. 27, 2007

(54) SQUARE ROOT METHOD FOR COMPUTATIONALLY EFFICIENT MODEL PREDICTIVE CONTROL

(75) Inventor: James W. Fuller, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 446 days.

(21) Appl. No.: 10/620,569

(22) Filed: Jul. 16, 2003

(65) Prior Publication Data

US 2005/0015421 A1 Jan. 20, 2005

(51) Int. Cl.
G06F 15/18 (2006.01)

(52) U.S. Cl. .............................. 706/14; 706/12; 706/46

(58) Field of Classification Search ................. 706/14, 706/12, 46; 395/500.23; 703/2
See application file for complete search history.

(56) References Cited

U.S. PATENT DOCUMENTS

| | | | | |
|---|---|---|---|---|
| 5,654,907 A | * | 8/1997 | Lange | 702/104 |
| 6,064,809 A | * | 5/2000 | Braatz et al. | 703/2 |
| 7,152,023 B2 | * | 12/2006 | Das | 703/2 |
| 2004/0107012 A1 | * | 6/2004 | Das et al. | 700/53 |
| 2004/0162709 A1 | * | 8/2004 | Das | 703/2 |

FOREIGN PATENT DOCUMENTS

WO WO 01/79945 A1 10/2001

OTHER PUBLICATIONS

T. A. Driscoll et al, Computational Efficiency of a Functional Expansion Algorithm for Linear Quadratic Optimal Control, 1992, IEEE, CH3229-2/92/0000-0143, 143, 144.*
Matthew J. Tenny, Nonlinear Model Predictive Control via Feasibility-Perturbed Sequential Quadratic Programming, 2002, University of Wisconsin, 1-29.*
Edward Rothberg, Techniques for Improving the Performance of Sparse Matrix Factorization on Multiprocessor Workstations, IEEE, CH2916-5/90/0000/0232, 232-241.*
Christopher V. Rao et al, Application of Interior-Point Methods to Model Predictive Control, Argonne National Laboratory, 1-31.*
Gene H. Golub, Charles F. Van Loan, Matrix Computations Third Edition, pp. 210-211 & 224-225.
Thomas Kailath, Linear Systems, pp. 248-253, Prentice-Hall Inc., Englewood Cliffs, NJ.
Christopher V. Rao, Stephen J. Wright, James B. Rawlings, Application of Interior-Point Methods to Model Predictive Control, Mathematics and Computer Science Division Argonne National Laboratory pp. 1-31.
Search Rpt. EP04254226.
Rothberg E et al.: "Techniques for improving the performance of sparse matrix factorization on multiprocessor workstations", Proceedings of the supercomputing conference. New York Nov. 12-16, 1990 Washington IEEE comn. Soc. Press US vol. Conf 3. Nov. 12, 1990, pp. 232-241, XP0100019944. ISBN: 0-8181-2056-0 *the whole document*.
Driscoll T A et al.: "Computational efficiency of a functional expansion algorithm for linear quadratic optimal control" Proceedings of the conference on decision and control. Tucson, Dec. 16, vol. 3 Conf. 31, Dec. 16, 1992, pp. 143-144, XP010108119. ISBN: 0-7803-0872-7 *the whole document*.

* cited by examiner

Primary Examiner—Joseph P Hirl
(74) Attorney, Agent, or Firm—Carlson, Gaskey & Olds

(57) ABSTRACT

An efficient method for solving a model predictive control problem is described. A large sparse matrix equation is formed based upon the model predictive control problem. The square root of H, Hr, is then formed directly, without first forming H. A square root (LSMroot) of a large sparse matrix of the large sparse matrix equation is then formed using Hr in each of a plurality of iterations of a quadratic programming solver, without first forming the large sparse matrix and without recalculating Hr in each of the plurality of iterations. The solution of the large sparse matrix equation is completed based upon LSMroot.

34 Claims, 2 Drawing Sheets

SQUARE ROOT METHOD FOR COMPUTATIONALLY EFFICIENT MODEL PREDICTIVE CONTROL

This invention was conceived in performance of work under U.S. Government Contract N00421-01-2-0131.

BACKGROUND OF THE INVENTION

This invention relates to generally to control systems and more particularly to model predictive control systems.

Model predictive control logic has many advantages in controlling practical multivariable systems. A multivariable system has multiple goals (also known as commands) and has multiple effectors that change system dynamics, for achieving those goals. Multivariable systems may also include significant cross-coupling, in which key effectors each significantly effect multiple goals. Therefore, a controller for this system should also be multivariable to decouple the responses. In a decoupled system, when a goal changes, the control algorithm responds by setting multiple effectors so that this one goal changes without significantly changing the other goals. Furthermore, the system cross-coupling is often dynamic, changing in time, where some coupling is persistent, some transitory, some fast, some slow, or it may first couple in one direction, then reverse and couple in the other. Therefore the control algorithm decoupling should also be dynamic, evolving in time to counter the changing nature of the coupling. In addition to de-coupling, the multivariable control logic must also provide the tradition feedback properties of reducing the effects of changes in the system dynamics and the effects of disturbances, all while ensuring the system remains stable, safe, and durable.

There is much control theory, some reduced to practice, supporting the design of feedback control logic for coupled multivariable systems. Most of this theory presumes the system to be controlled has no inequality constraints, referred to as limits here, on any of the system variables or effectors. This is a very significant mismatch between theory and practice. Real and practical systems have substantial and significant limits. Some limits are physical, such as effector ranges, and some are operational, to ensure stability, safety, and durability. In a real sense, if no limits are hit, the system has been over designed. This mismatch has led to great difficulties and ad hoc methods in control law design, including splitting logic into many modes, where there is a separate control mode to cover each permutation of limit or fault condition, and more ad hoc logic to dynamically control the switching between separately designed dynamic modes. Coordinating these modes and ensuring there are no adverse dynamic interactions between modes (e.g., repeatedly jumping back and forth between two modes, sudden jumps, etc.) requires a significant amount of additional ad hoc logic. Ad hoc design makes the control software difficult to design, difficult to maintain and greatly reduces the degree to which the software can be reused on a similar system.

Model predictive control (MPC) is a multivariable control theory that explicitly includes limits and, therefore, provides a good match with practical systems. MPC can also be configured to respond in realtime to changes in the system, such as actuator faults. Thus, MPC provides a formal method of control algorithm design for multivariable systems that can decouple responses, as well as physically possible, even as limits are hit and faults occur. In MPC design, there is no need for ad hoc designs of extra control modes to handle limit conditions and faults. This is expected to provide significant increases in controller software design productivity, make it easier to upgrade and otherwise maintain control software, and make it possible for the control system to accomplish more difficult tasks. The latter include more autonomous operation, more completely integrating system responses, and operating with reduced physical stresses.

The most significant roadblock to implementing model predictive control is the amount of computation required. That is why the initial practice of MPC, which began 20 to 30 years ago in the chemical industry, was for systems with relatively slow dynamics. A chemical plant controller updates actuator settings on the order of once every 5 minutes. These early applications stressed the computer power available at the time. In a gas turbine engine, the update rate must be around 40 times per second, an approximately 12,000-fold difference, and the control function may be more complicated. Even so, MPC may be practical for engines, and other vehicle applications, because computers are now available that are 500 to 1000 times faster. That still leaves a 10 to 30-fold gap, depending on system complexity, between the computation MPC appears to require and computer power available. This invention is critical because it provides numerical techniques for reducing the computational burden of model predictive control by 20 to 100-fold, closing the gap.

Model Predictive Control

Model predictive control theory has been reduced to practice, most notably in the chemical industry. In support of this, model predictive control theory has been described in numerous technical papers and textbooks. It is summarized here. The main objective of this summary is to show that implementing MPC requires a large amount of onboard computation and that approximately 90% of this computation involves numerous solutions of a large matrix equation in realtime. This section shows that when the optimality equations and variables are ordered in a certain way, the matrix equation has a particular sparse, banded, symmetric structure. These properties imply the matrix includes many zeros, the nonzero entries are gathered near the diagonal, and a matrix "square root" exists. This particular form is developed in this section and termed the Large Sparse Matrix Equation (LSME) equation. The square root method exploits this structure in a novel way to greatly reduce computation.

In model predictive control, actuator commands, u, are determined as the result of solving an optimization problem in realtime. Model predictive control is a type of digital controller. Digital controllers are based on a computer that periodically samples operator commands and measured responses. As a consequence of each sample, the digital controller specifies new actuator settings, which is referred to as a controller update. These settings are most often held until the next update. MPC specifies these settings as the first time point of an actuator trajectory. The trajectory specifies u(n), for controller update times numbered with integer n, where n varies from L to N+L−1. That is, for N time points. The current sample time is enumerated L. This actuator trajectory is determined as the unique trajectory that minimizes the performance index, PI, where $$PI = \frac{1}{2} x_{N+L}^T M_{N+L}^T M_{N+L} x_{N+L} + \frac{1}{2} \sum_{n=L}^{N+L-1} [x^T \ u^T]$$

-continued $$\begin{bmatrix} C^T \\ D^T \end{bmatrix} Q^{T/2} Q^{1/2} [C \ D] \begin{bmatrix} x \\ u \end{bmatrix}_n + [f_n^T \ g_n^T]$$

$$\begin{bmatrix} x \\ u \end{bmatrix}_n + u^T R^{T/2} R^{1/2} u_n$$

and where the summation is over the N future time points. $x_n$ is a vector of the states of a system dynamic model and $u_n$ are the actuator commands at each of the N time points. The matrices C and D are coefficients of linearized output equations, which relate system outputs for which there are goals to the dynamic model states and actuator settings. Q and R are lower triangular weighting matrices, and vectors f and g are driving terms that are functions of a desired trajectory for the system output, desired or nominal actuator values, and weighting matrices Q and R. Lower triangular matrix M is a terminal-weighting matrix and may be present for a variety of control theoretic reasons.

The nominal system and, therefore, the optimization must obey the state dynamics model of the system $$x_{n+1} = A_n \cdot x_n + B_n \cdot u_n + b_n$$

which optimization procedures term equality constraints. The optimization must also obey the physical and operational limits linked to the Limited variables $yc(n) = Cc_n \cdot x_n + Dc_n \cdot u_n + a_n \leq Y_n$ for the N time points. The first equality represents a model of how the limited variables are linked to the state dynamics model. The explicit inclusion of the limit equation in the theory and resulting logic design is a key advantage of MPC.

A MPC designer specifies the control algorithm by determining the state dynamics model, the limit model, and the performance index. Performance index design involves selecting the variables to include in output vector, y, and choosing the weighting matrices Q, R, and M. The control software designer must also provide reusable software for solving the optimization problems in realtime.

The above optimization problem is a quadratic programming problem: a special type of constrained mathematical optimization. Quadratic programming is much more reliable than general purpose constrained optimization, and the associated restrictions are mild. The two major methods for solving quadratic programming (QP) problems on a computer are Active Set (AS) methods and Interior Point (IP) methods. The invention described below will significantly reduce the amount computation needed with either.

In MPC operation, the state vector at the current sample time, $x_L$, is given. It is a function of measurements of the system response up to the controller update time L. Thus, the MPC controller is a feedback controller. The net output of the above optimization is the vector $u_L$, the first time point in the u trajectory, which is the actuator command for the $L^{th}$ update of the MPC controller.

The same MPC optimization must be performed, with the variables shifted in time, to determine the next actuator command, $u_{L+1}$. The MPC optimization must be re-solved every controller update period. The next three sections summarize how the above type of optimization is most commonly solved in an analytical fashion.

Adjoint Methods for Absorbing Constraints Into J

In the usual method of solution for the optimal control, the equality constraints (the state dynamics model) are adjoined to the performance index with Lagrange multipliers, pn, and the inequality constraints (the model of system variables with respect to their physical limits) are adjoined with multipliers, mn, to form the augmented performance index as follows.

$$Ja = \frac{1}{2} x_{N+L}^T P_{N+L} x_{N+L} + \sum_{n=L}^{N+L-1} \frac{1}{2} [x^T \ u^T] \begin{bmatrix} C^T \\ D^T \end{bmatrix} Q^{T/2} Q^{1/2}$$

$$[C \ D] \begin{bmatrix} x \\ u \end{bmatrix}_n + [f_n^T \ g_n^T] \begin{bmatrix} x \\ u \end{bmatrix}_n + u^T R^{T/2} R^{1/2} u +$$

$$p_{n+1}^T (A_n \cdot x_n + B_n \cdot u_n + b_n - x_{n+1}) +$$

$$m_n^T (Cc_n \cdot x_n + Dc_n \cdot u_n + a_n - Y_n)$$

and the terminal weight $P_N = M_N^T M_N$.

In the Lagrange method, the adjoined constraint terms are formulated so that the constraints are satisfied when the augmented performance index is optimized as if there were no constraints. The adjoined terms also have zero value at the optimal. Thus adjoining the constraints does not change the value of optimal J. For inequality constraints the adjoint method also requires that for each limit, at each time n, either the corresponding m=0 or the inequality constraint is on its limit.

Karush-Kuhn-Tucker (KKT) Conditions

A set of algebraic equations whose solution specify the optimal system trajectory are known as the (KKT) conditions. For the above MPC optimization, it is known that the solution includes the following KKT conditions for each controller update between time L and time N+L−1:

$$\begin{bmatrix} C^T \\ D^T \end{bmatrix} Q^{T/2} Q^{1/2} [C \ D] \begin{bmatrix} x \\ u \end{bmatrix}_n + R^{T/2} R^{1/2} \cdot u_n +$$

$$\begin{bmatrix} f \\ g \end{bmatrix} + \begin{bmatrix} A^T \\ B^T \end{bmatrix} p_n - \begin{bmatrix} I \\ 0 \end{bmatrix} p_{n+1} + \begin{bmatrix} Cc^t \\ Dc^t \end{bmatrix} m_n = 0$$

$$A_n \cdot x_n + B_n \cdot u_n + b_n - x_{n+1} = 0$$

$$Cc_n \cdot x_n + Dc_n \cdot u_n + a_n + t_n - Y_n = 0$$

$$t_n \cdot m_n = 0$$

the split boundary conditions:

$x_L = \text{xfeedback}$ and $p_{N+L} = M_{N+L}^T M_{N+L} x_{N+L}$ and the additional conditions that all t's and m's must be greater than zero. If these equations are solved, the actuator commands, u(n), that are part of the solution, used as inputs to state equation model of the system dynamics, will minimize the performance index, while meeting the limits.

General Large Sparse Matrix Equation for Quadratic Programming

The KKT conditions for the N time points can be collected into the following large sparse matrix equation (LSME). This must be repeatedly solved when solving the MPC quadratic programming problem, using either Interior Point (IP) or Active Set (AS) methods. The LSME has the form:

$$\begin{bmatrix} -T^T T & J \\ J^T & H \end{bmatrix} \cdot \begin{bmatrix} m \\ z \end{bmatrix} = \begin{bmatrix} K \\ f \end{bmatrix}$$

where z is a vector containing the state, x, control, u, and state equation adjoint variable, p, for each time point, group by time. m is the adjoint variables for the inequality constraints, grouped by time. f and K are vectors. H and J are banded matrices, where $$H \equiv \begin{bmatrix} D_0^T Q_0 D_0 + R_0 & B_0^T & & & & & & & & \\ B_0 & 0 & -I & & & & & & & \\ 0 & -I & C_1^T Q_1 C_1 & C_1^T Q_1 D_1 & A_1^T & & & & & \\ & 0 & D_1^T Q_1 C_1 & D_1^T Q_1 D_1 + R_1 & B_1^T & & & & & \\ & & A_1 & B_1 & 0 & -I & & & & \\ & & & 0 & -I & C_2^T Q_2 C_2 & C_2^T Q_2 D_2 & A_2^T & & \\ & & & & & \ddots & \ddots & & \ddots & \\ & & & & & 0 & D_{N-1}^T Q_{N-1} C_{N-1} & D_{N-1}^T Q_{N-1} D_{N-1} + R_{N-1} & B_{N-1}^T & \\ & & & & & & A_{N-1} & B_{N-1} & 0 & -I \\ & & & & & & & & 0 & -I & Q_N \end{bmatrix}$$

$$J = \begin{bmatrix} Dc_1 & 0 & Cc_1 & & & \\ & & & Dc_2 & 0 & Cc_2 \\ & & & & \ddots & \ddots \\ & & & & & & Dc_N & 0 & Cc_N \end{bmatrix}, z = \begin{bmatrix} u_0 \\ p_1 \\ x_1 \\ u_1 \\ p_2 \\ x_2 \\ u_2 \\ \vdots \\ x_{N-1} \\ u_{N-1} \\ p_N \\ x_N \end{bmatrix}, \text{ and } m = \begin{bmatrix} m_1 \\ m_2 \\ \vdots \\ m_N \end{bmatrix}$$

T is a diagonal matrix and, the matrices are shown for the controller update at time L=0. Matrix H is also symmetric, which implies there is a square root matrix, Hr, such that Hr'*Hr=H. The LSME has the same form at other time points but with different parameter values. The LSME is common to both of the major quadratic program solvers, except that the value of T and the right hand side (RHS) vector depend on the quadratic program solver used. With either method the LSME must be solved repeatedly (10 to several hundred times, depending on system complexity) for each controller update.

This form of the LSME is novel and special. It is achieved by ordering the optimality equations (rows of the LSME) and the variables in z in a special way. Then the resulting LSME matrix is sparse, banded, and symmetric.

Interior Point Methods

In the Interior Point method for solving quadratic programs, T is diagonal. Each element is the square root of the product of the corresponding slack variable, t, and adjoint variable, m, for each time point. J is sparse banded matrix, and includes all the limit equations. For the most popular family of interior point methods, T and the right hand side vector vary twice each iteration. The right hand side vector is determined from the solution of the previous iterate. H and J remain constant for the iterations at the same controller update period. The solution for the optimal actuator settings will require 10 to several hundred iterations, depending on problem complexity. For more explanation, see Ref. 1, especially their case where the slack variable has been eliminated.

Active Set Methods

The Active Set method searches for which limits are active. Only some of the inequality constraints, Jc*z<=Ymax, will be active. Each iteration of an Active Set qpsolver "guesses" which of the constraints are active. Let the vector "active" contain the indices of the active constraints. When active, the inequalities become equalities, and Jc(active,:)*z=Ymax(active), and the system is running on the active limits. Compared to the LSME, J=Jc(active,:), K=Ymax(active), and T=0. In a given controller update period, a number of iterations of "active" will be evaluated in a search for the correct active set. The search strategy determines a new iteration of "active" based on the results of the previous iterate's solution of the LSME. H will remain constant for the iterations for a given controller update.

The key observation here is that some form of the LSME must be solved numerous times to solve the MPC quadratic program each controller update, whether interior point or active set solver is used. For practical controllers, the LSME is solved 10 to 100 times per controller update, depending on N and other factors.

SUMMARY OF THE INVENTION

The novel algorithm described here improves upon this prior art by providing a square root method for factoring the Large Sparse Matrix Equation. Solving matrix equations such as the LSME involves first factoring the matrix into the product of an upper triangular matrix, one or more diagonal matrices, and a lower triangular matrix (or vice versa) and then solving easier matrix equations, two of which involve triangular matrices and the rest diagonal matrices.

Among other novel features described in more detail below, the present invention uses a novel method to form LSMroot directly, without the need to ever form the Large Sparse Matrix itself. The present invention also uses a novel method to form Hr directly once per controller update, without the need to first form H, and uses Hr throughout the quadratic program solution.

These and other novel features of the present invention reduce the computational burden of model predictive control by 10 to 30-fold. This reduction in the computational burden makes the use of model predictive control practical for more complicated systems with much faster dynamics, such as a gas turbine engines.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
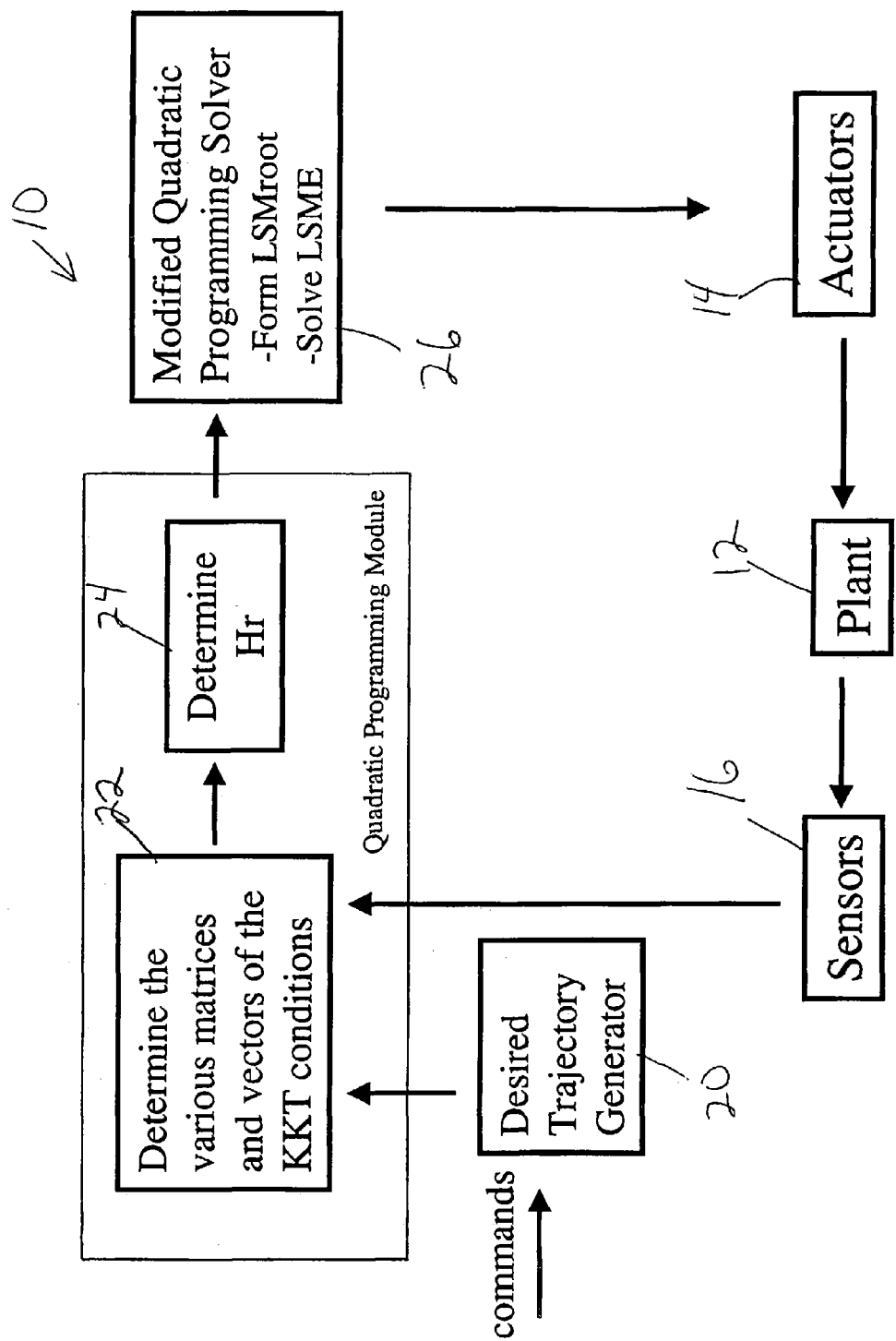
FIG. 1 is a schematic of a model predictive control system according to the present invention.

The algorithm of the present invention provides a square root method for factoring the Large Sparse Matrix Equation. Solving matrix equations such as the LSME involves first factoring the matrix into the product of an upper triangular matrix, one or more diagonal matrices, and a lower triangular matrix (or vice versa) and then solving easier matrix equations, two of which involve triangular matrices and the rest diagonal matrices. For the expected MPC problem sizes, the factorization is one to two orders of magnitude more complex than the solution of the diagonal and both triangular matrix equations combined. This invention is an algorithm for performing this factorization much faster.

At the highest level of description, this algorithm achieves great numerical efficiency by:

1. Ordering the equations and variables to get a symmetric, banded LSME.
2. Realizing this LSME needs to be solved many times each controller update
3. Realizing that because the LSME matrix, LSM, is symmetric that it has a complex square root matrix, LSMc such that LSM=LSMc'*LSMc and LSMc is lower triangular.
4. Generalizes this concept of a square root matrix to use only real numbers (for computational efficiency) so that LSM=LSMroot'*S* LSMroot, S is a constant diagonal with only 1 or −1 entries along the diagonal, and LSMroot is lower triangular.

5. Uses a novel method to form LSMroot directly, without the need to ever form LSM.
6. Realizing that at a given controller update, the matrix H remains constant throughout the quadratic program solution and that it has a square root, Hr.
7. Using a novel method to form Hr directly, without the need to form H. This involves a sequence of smaller well-known QR factorizations.
8. Using a novel method to form LSMroot for each iteration of the quadratic program solver by solving one of two generalized QR factorizations, each of which reuse Hr.
9. Novel algorithms for performing the generalized QR factorization.
10. Using standard methods for completing the solution of the LSME once the LSM has been factored into form of Step 4.

These steps embody two key novel means for the efficient factorization of the LSME. The first is the efficient factorization of the submatrix H, which only needs to be done once per controller update (Steps 1, 6, and 7). The second is reuse of the H factorization to more quickly factor the entire LSME (Steps 8 and 9), which needs to be done 10 to 200 times per controller update (once or twice per QP iteration), depending on the QP method and size of problem.

Once per Controller Update: Factor H

Input the submatrices of H and J: A. B. C, D, $Q^{1/2}$, $R^{1/2}$, and Cc and Dc, which describe the MPC problem for this controller update. Factor H as follows.

Step I: Compute the N separate and smaller QR factorizations, using a standard QR factorization algorithm $$\begin{bmatrix} Q^{1/2}C_n & Q^{1/2}D_n \\ M_n A_{n-1} & M_n B_{n-1} \\ 0 & R^{1/2} \end{bmatrix} = Ortho * \begin{bmatrix} 0 & 0 \\ M_{n-1} & 0 \\ G_{n-1} & F_{n-1} \end{bmatrix} \quad (1)$$

Start with n=N and work backwards in time to N−1, N−2, . . . , 1. The left hand side matrix is the input to the factorization; the right hand side is the result. In the standard methods, it is optional whether the orthogonal matrix, Ortho, is produced. It is not needed here. The matrices A, B, C, D, $Q^{1/2}$ and $R^{1/2}$ are specified ahead time, as is $M_N$. The first QR factorization then determines $M_{N-1}$, which is an input to the second factorization for time N−1, and so on. Thus all N can be performed recursively, backward in time. This recursive sequence of QR factorizations and their value in solving the unconstrained MPC problem (if J and K equal 0) are known in control theory textbooks. Their use in factoring H (Step 2) is novel. As is the reuse of factored H in manner that allows H to be factored only once per controller update (Steps 3, 4, and 5).

Step 2: Form matrices L and W where L is lower triangular and W is block diagonal, as follows. Also, form and store the diagonal elements of matrix S, whose entries are 1 for except for columns corresponding the adjoint variables, p, in vector z, in which case the entries are −1.

$$L = \begin{bmatrix} F_0 \\ -M_1B_0 & I \\ 0 & I & -M_1 \\ & 0 & G_1 & F_1 \\ & & -M_2A_1 & -M_2B_1 & I \\ & & & 0 & I & -M_2 \\ & & & & & \ddots & \ddots \\ & & & & & 0 & G_{N-1} & F_{N-1} \\ & & & & & & -M_NA_{N-1} & -M_NB_{N-1} & I \\ & & & & & & & 0 & I & -M_N \end{bmatrix} \quad (2)$$

$$S = \begin{bmatrix} I \\ & -I \\ & & I \\ & & & I \\ & & & & -I \\ & & & & & I \\ & & & & & & \ddots \\ & & & & & & & I \\ & & & & & & & & -I \\ & & & & & & & & & I \end{bmatrix} \quad W = \begin{bmatrix} I \\ & M_1 \\ & & I \\ & & & I \\ & & & & M_2 \\ & & & & & I \\ & & & & & & \ddots \\ & & & & & & & I \\ & & & & & & & & M_N \\ & & & & & & & & & I \end{bmatrix} \quad (3)$$

Standard methods for efficient matrix computation would store the same information in L, S, and W in a more compact manner. The sparse matrix form is used here to aid comprehension.

There is no need to determine H in this algorithm. However, if H is desired it can be computed with $$H = Hr'*S*Hr, \text{ where } Hr = L\ W^{-T}. \quad (4)$$

To save computations, Hr is not explicitly formed either. Instead, L S, and W are separately used.

Every Quadratic Program Solver Iteration: Factor and Solve a LSME

Input the parameters that describe the next LSME that needs to be solved from the QP solver search method: T, K, and f. In general, quadratic program solution involves a structured, iterative search for the solution. The search method and the parameters used to specify the LSME are different with AS and IP. Accordingly, the remaining steps of the square root algorithm differ for IP and AS methods.

Step 3(IP): Perform the following generalized QR factorization, using the generalized QR algorithm described in the next section.

$$\begin{bmatrix} 0 \\ P \end{bmatrix} = U \cdot Pin, \text{ where } Pin = \begin{bmatrix} T^{-T}J \\ L \end{bmatrix} \quad (5)$$

The matrix in square brackets on the right is the input; the other matrices are the output. U does not need to be computed here. P is a lower triangular matrix. Since T is diagonal and J and L are banded, P will be banded as well and the special QR factorization can be used to exploit the banded structure to reduce computations. This is a novel, generalized factorization because U in not orthonormal. Instead, U has the more general property $$U^T \begin{bmatrix} I \\ & S \end{bmatrix} U = \begin{bmatrix} I \\ & S \end{bmatrix}$$

The matrix (termed LSM) in the LSME does not need to be form here. However, if desired, it can be computed as follows.

$$LSM \equiv \begin{bmatrix} H & J^T \\ J & -T^T T \end{bmatrix} = LSME_{root}^T \begin{bmatrix} S & \\ & -I \end{bmatrix} LSME_{root}, \text{ where} \quad (6)$$

$$LSME_{root} \equiv \begin{bmatrix} P & 0 \\ -T^{-T}J & T \end{bmatrix} \begin{bmatrix} W^{-T} \\ & I \end{bmatrix}$$

Step 4(IP): Solve the intermediate equation $$\begin{bmatrix} P^T & J^T T^{-1} \\ 0 & T^T \end{bmatrix} \begin{bmatrix} w1 \\ w2 \end{bmatrix} = \begin{bmatrix} W \cdot f \\ K \end{bmatrix} \quad (7)$$

for $w1$ and $w2$ via a block back substitution comprising the substeps:
4.1. Solve $T^T w2 = K$, for $w2$, using a standard method for diagonal matrices
4.2. Solve $T \cdot q1 = w2$ for $q1$, using a standard method for diagonal matrices
4.3 Solve $q2 = W \cdot f - J^T q1$, using a method that exploits the structue of W and J
4.3. $P^T w1 = q2$ for $w1$, using a standard method for backsubstitution for banded matrices Step 5(IP): Solve the final equation for $mz$ and $m$.

$$\begin{bmatrix} P & 0 \\ -T^{-T}J & T \end{bmatrix} \begin{bmatrix} mz \\ m \end{bmatrix} = \begin{bmatrix} S \cdot w1 \\ w2 \end{bmatrix} \quad (8)$$

via the block forward substitution method using the substeps:
5.1. Solve $q3 = S \cdot w1$, using a method that exploits the structure of S
5.2 Solve $P \cdot mz = q3$ for $mz$, using a standard method for forward substitution for banded matrices
5.3. Solve $q4 = T^{-T} J \cdot mz$, for $q4$, using a method that exploits the structure of T and J
5.3. Solve $T \cdot m = w2 - q4$, for $m$, using a standard method for diagonal matrices
5.4. If the variables, p, are needed: solve $z = W^T mz$, using a standard method for back substitution, modified to exploit the structure of W (the p's are the only elements of z that differ from mz)

The LSME is now solved. The variables $m$ and $z$ (or $mz$) are output to the search method of the IP method.

Step 3(AS): Perform the following generalized QR factorization, using the generalized QR algorithm described in the next section.

$$S_R^{1/2} P = S^{1/2} U \cdot Pin, \text{ where } Pin = [L^{-T} J^T] \quad (9)$$

The matrix in square brackets on the right is the input; the other matrices are the outputs. U does not need to be computed here. P is upper triangular. Unfortunately, the banded structure of $L^T$ is lost when it is inverted, thus, the QR factorization cannot exploit the banded structure to save computation and P is not banded. This is a novel, generalized factorization because U is not orthonormal. Instead, U has the more general property $$U^T S \cdot U = S$$

$L^{-T} J^T$ is an upper triangular matrix, except for a band of nonzero entries below the diagonal. The generalized QR factorization should exploit the fact that the lower triangular part below this band is already zero.

There is no need to determine the matrix LSM. However, it can be computed as follows.

$$\begin{bmatrix} 0 & J \\ J^T & H \end{bmatrix} = LSM_{root}^T \begin{bmatrix} -S_R & 0 \\ 0 & S \end{bmatrix} LSM_{root} \quad (10)$$

$$LSM_{root} = \begin{bmatrix} P & 0 \\ SL^{-T}J^T & L \end{bmatrix} \begin{bmatrix} I \\ & W^{-T} \end{bmatrix}$$

Matrix T is zero in the AS method.
Step 4(AS): Solve the intermediate equation $$\begin{bmatrix} P^T & J \cdot L^{-1} S \\ 0 & L^T \end{bmatrix} \begin{bmatrix} w1 \\ w2 \end{bmatrix} = \begin{bmatrix} K \\ W \cdot f \end{bmatrix} \quad (11)$$

for $w1$ and $w2$ via block back substitution using the substeps:
4.1. Solve $L^T w2 = W \cdot f$, for $w2$, using a standard method for back substitution
4.2. Solve $q1 = S \cdot w2$, using a method that exploits the structure of S
4.2. Solve $L \cdot q2 = q1$ for $q2$, using a standard method for forward substitution
4.3. $q3 = (K + J \cdot q2)$, using a method that exploits the banded structure of J
4.4. $P^T w1 = q3$ for $w1$, using a standard method for forward substitution Step 5(AS): Solve the final equation $$\begin{bmatrix} P & 0 \\ SL^{-T}J^T & L \end{bmatrix} \begin{bmatrix} m \\ mz \end{bmatrix} = \begin{bmatrix} -S_R \cdot w1 \\ S \cdot w2 \end{bmatrix}. \quad (12)$$

for $m$ and $mz$ via the block forward substitution method using the substeps:
5.1. Solve $q4 = -S_R \cdot w1$, using a method that exploits the structure of Sr
5.2 Solve $P \cdot m = q4$ for $m$, using a standard method for back substitution
5.3 Solve $q5 = J^T m$, using a method that exploits the structure of J
5.4 Solve $L^T q6 = q5$, for $q6$, using a standard method for back substitution
6. Solve $q7 = S(w2 - q6)$, using a method that exploits the structure of S
6. Solve $L \cdot mz = q7$ for $mz$, using a standard method for forward substitution
7. If the variables, p, are needed: solve $z = W^T mz$, using a standard method for back substitution, modified to exploit the structure of W Generalized QR Factorization Algorithm A novel generalized QR factorization is required in Step 3 (AS or IP). Well known algorithms are available to determine a traditional QR factorization of the form P=U*Pin, where Pin is input matrix, U has the property that $U^T U = I$, and P is either upper triangular or lower triangular.

The methods described are a novel extension of a family of known QR methods using a sequence of Householder transformations.

The Step 3 factorizations in the square root method require $Sr^{1/2}P=S^{1/2}U*Pin$, where Pin and S are inputs, Sr and S are diagonal matrices whose diagonal entries are either 1 or −1, P is lower triangular or upper triangular, Sr is an output, and U has the property that $U^T S*U=S$. Note that if Pin is real, then P is also real. U may contain complex number components. This factorization can be performed in the same manner as the well-known method of QR factorization using a sequence of Householder transformations, if the following transforms are used in place of the Householder transforms.

$$\text{New Transform} \equiv (I + e_i e_i^T(\sqrt{sw} - 1)) \cdot U_i, \text{ where } U_i = \left(I - 2\frac{v \cdot v^T S}{v^T S \cdot v}\right)$$

$$\text{and } z = \frac{x_i^T S \cdot x_i}{S_i}, \sigma = \sqrt{|z|}, sw = sqn(z), v = x_i - \sqrt{sw} \cdot \sigma \cdot e_i.$$

and $e_i$ is a column vector of zeros except for a 1 entry in the ith location. $x_i$ and $e_i$ are defined following the same procedure as in the traditional QR factorization. The above description using matrices and vectors is for explanatory purposes only. Those skilled in computation linear algebra know that the algorithm that implements this could save computations by not actually forming U and v. Those so skilled also know how to arrange the sequence of transformations, define each x based on the input matrix, and apply the transformations to produce either a lower triangular or upper triangular output matrix, P. The output matrix, Sr, is a diagonal matrix where each element is the product of the corresponding sw and S elements. As a further explanatory aid, when S is equal to the identity matrix, all sw's will be one and the new transform is reduced to the traditional Householder transform. Other than the substitution for the Householder transform, tradition QR factorization algorithms can be used to produce the factorizations in Step 3 (AS or IP) and can be used to exploit the structure, which is optional, in Step 3 IP. Note that in Step 3 IP, the structure of Pin will result in Sr equal to the identity matrix, so Sr can be omitted.

Theoretical Basis for Square Root Factorization

Theory for Generalized QR Factorization

The U defined in the generalized QR factorization has the property that $$U_i^T S \cdot U_i = \left(I - 2\frac{S \cdot v \cdot v^T}{v^T S \cdot v}\right) S \left(I - 2\frac{v \cdot v^T S}{v^T S \cdot v}\right)$$

$$= S - 4\frac{S \cdot v \cdot v^T S}{v^T S \cdot v} + 4\frac{S \cdot v \cdot (v^T S \cdot v) \cdot v^T S}{v^T S \cdot v} = S$$

U also has the property that $$U_i x_i = \left(I - 2\frac{v \cdot v^T S}{v^T S \cdot v}\right) x_i = x_i - v \cdot \frac{2 \cdot v^T S \cdot x_i}{v^T S \cdot v}$$

$$= x_i - (x_i - e_i \sigma)\frac{2 \cdot (x_i^T S \cdot x_i - \sigma \cdot x_i^T e_i)}{x_i^T S \cdot x_i + S_i \sigma^2 - 2 \cdot \sigma \cdot x_i^T e_i}$$

$$= x_i - (x_i - e_i \sigma)\frac{2 \cdot (x_i^T S \cdot x_i - \sigma \cdot x_i^T e_i)}{2 \cdot x_i^T S \cdot x_i - 2 \cdot \sigma \cdot x_i^T e_i} = e_i \sigma$$

where xi was used in defining v.

Thus, the transform zeros out all the elements of a column matrix but one, which is set to $\sigma$. The use of this later property to transform a matrix into triangular form is well known. When this is done there is a sequence of transforms taking Pin to P:

$$P=[(I+e_i e_i^T(\sqrt{sw_i}-1))\cdot U_i]\cdot[(I+e_j e_j^T(\sqrt{sw_j}-1))\cdot U_j]\ldots$$
$$[(I+e_k e_k^T(\sqrt{sw_i}-1))\cdot U_k]\text{Pin}$$

Due to the structure defined for U and e in the sequence, this can be rearranged into the form $$P=S_w^{1/2}\cdot U\cdot\text{Pin where}$$

$$S_w^{1/2} \equiv (I+e_i e_i^T(\sqrt{sw_i}-1))\cdot(I+e_j e_j^T(\sqrt{sw_j}-1))\ldots$$
$$(I+e_k e_k^T(\sqrt{sw_i}-1))$$

$$U \equiv U_i \cdot U_j \ldots U_k$$

Sr and Sw are related $S_R^{-1/2} S^{1/2} = S_w^{1/2}$. Replacing Sw with Sr yields $$S_R^{1/2} P = S^{1/2} \cdot U \cdot \text{Pin}$$

$$P^T S_R P = \text{Pin}^T U^T S \cdot U \cdot \text{Pin} = \text{Pin}^T S \cdot \text{Pin}$$

where the last equation is the result of multiplying each side of the previous on its left by its respective transpose. The last equation shows this is the desired transform.

Theory for Factoring H

The theory of the factorization of H is based on identities formed by multiplying each side of Eq. 1 by its respective transpose for each time point to yield $$F^T \cdot F - B^T \cdot M^T \cdot M \cdot B = D^T Q^{T/2} Q^{1/2} D + R^{T/2} R^{1/2}$$

$$M^T \cdot M + G^T \cdot G - A^T \cdot M^T \cdot M \cdot A = C^T Q^{T/2} Q^{1/2} C$$

$$F^T \cdot G - B^T \cdot M^T \cdot M \cdot A = D^T Q^{T/2} Q^{1/2} C$$

These identities are known in control theory textbooks. Their use to factor H and LSM is novel. The factorization of H can be verified by symbolically expanding the expression $W^{-1} L^T SL\, W^{-T}$ using the definitions for L, S, and W in Eqs. 2 and 3, and then using these identities.

Theory for Factoring the LSME for IP Method

The factorization in Eq. 5 implies $$[0\ P^T]\begin{bmatrix}I\\&S\end{bmatrix}\begin{bmatrix}0\\P\end{bmatrix}=[J^T T^{-t} L^T]U^T\begin{bmatrix}I\\&S\end{bmatrix}U\begin{bmatrix}T^{-T}J\\L\end{bmatrix}\Rightarrow$$

$$P^T S \cdot P = [J^T T^{-t} L^T]\begin{bmatrix}I\\&S\end{bmatrix}\begin{bmatrix}T^{-T}J\\L\end{bmatrix} = J^T T^{-t} T^{-T} J + L^T SL$$

Rearrange this to get the needed relation $$W^{-1} P^T S \cdot P \cdot W^{-T} - J^T T^{-t} T^{-T} J = W^{-1} L^T SL \cdot W^{-T} = H$$

If we substitute Eq 8 into Eq 7 and use the fact that $S^{-1}=S$, we get $$\begin{bmatrix} P^T & -J^T T^{-1} \\ 0 & T^T \end{bmatrix}\begin{bmatrix} S & \\ & -I \end{bmatrix}\begin{bmatrix} P & 0 \\ -T^{-T}J & T \end{bmatrix}\begin{bmatrix} mz \\ m \end{bmatrix} = \begin{bmatrix} W \cdot f \\ K \end{bmatrix}$$

Scale the first block of rows by $W^{-1}$ and substitute in for mz to yield $$\begin{bmatrix} W^{-1}P^T & -J^T T^{-1} \\ 0 & T^T \end{bmatrix}\begin{bmatrix} S & \\ & -I \end{bmatrix}\begin{bmatrix} P \cdot W^{-T} & 0 \\ -T^{-T}J & T \end{bmatrix}\begin{bmatrix} z \\ m \end{bmatrix} = \begin{bmatrix} f \\ K \end{bmatrix}$$

Symbolic performing the matrix multiplications $$\begin{bmatrix} W^{-1}P^T S \cdot P \cdot W^{-T} - J^T T^{-1} T^{-T} J & J^T \\ J & -T^T T \end{bmatrix}$$

$$\begin{bmatrix} z \\ m \end{bmatrix} = \begin{bmatrix} f \\ K \end{bmatrix} \Rightarrow \begin{bmatrix} H & J^T \\ J & -T^T T \end{bmatrix}\begin{bmatrix} z \\ m \end{bmatrix} = \begin{bmatrix} f \\ K \end{bmatrix}$$

This shows the Square Root Algorithm for IP solves the LSME, presuming the algorithm for performing generalized QR factorization of Eq. 5 works.

Theory for Factoring the LSME for AS Method

The factorization in Eq. 9 implies $$P^T S_R^{1/2} S^{-1/2} S \cdot S^{-1/2} S_R^{1/2} P = J \cdot L^{-1} U^T S \cdot U \cdot L^{-1} J^T$$

$$\Rightarrow P^T S_R P = J \cdot L^{-1} S \cdot L^{-1} J^T, \text{ where } S_R \equiv S_q^{1/2} S \cdot S_q^{1/2}$$

If we substitute Eq 12 into Eq 11 and use the fact that $S^{-1}=S$, we get $$\begin{bmatrix} P^T & J \cdot L^{-1} S \\ 0 & L^T \end{bmatrix}\begin{bmatrix} -S_R & 0 \\ 0 & S \end{bmatrix}\begin{bmatrix} P & 0 \\ SL^{-T}J^T & L \end{bmatrix}\begin{bmatrix} m \\ mz \end{bmatrix} = \begin{bmatrix} f \\ W \cdot f \end{bmatrix}$$

Scale the second block of rows by $W-1$ and substitute in for mz to yield $$\begin{bmatrix} P^T & J \cdot L^{-1} S \\ 0 & W^{-1} L^T \end{bmatrix}\begin{bmatrix} -S_R & 0 \\ 0 & S \end{bmatrix}\begin{bmatrix} P & 0 \\ SL^{-T}J^T & L \cdot W^{-T} \end{bmatrix}\begin{bmatrix} m \\ z \end{bmatrix} = \begin{bmatrix} K \\ f \end{bmatrix}$$

Symbolic performing the matrix multiplications $$\begin{bmatrix} -P^T S_R P + J \cdot L^{-1} SL^{-T} J^T & J \\ J^T & W^{-1} L^T SL \cdot W^{-T} \end{bmatrix}$$

$$\begin{bmatrix} m \\ z \end{bmatrix} = \begin{bmatrix} K \\ z \end{bmatrix} \Rightarrow \begin{bmatrix} 0 & -J \\ J^T & H \end{bmatrix}\begin{bmatrix} m \\ z \end{bmatrix} = \begin{bmatrix} K \\ f \end{bmatrix}$$

This shows the Square Root Algorithm for AS solves the LSME, presuming the algorithm for performing generalized QR factorization of Eq. 9 works.

Computational Efficiency of the Square Root Method

The advantages of this factorization are that

The LSME matrix is factored into the product of upper triangular, lower triangular matrix and diagonal matrices.

The LSME can then be solved with a block back substitution pass, with the block upper triangular matrix followed by a forward substitution pass with the block lower triangular matrix.

LSM and H do not need to be determined.

The computer wordlength needed for L, M, and P, is only half that needed for H and LSM for a given level of numerical accuracy. The ability to use single precision computer arithmetic, instead of double precision, approximately doubles the computation speed.

The factorization of H needs only be done once per controller update. Each iteration of the QP solver reuses this factorization.

Completion of the factorization each QP iteration exploits the banded structure. Fully for use in IP methods; partially in AS methods.

Further numerical efficiencies can be achieved with special QR and triangular matrix solvers that exploit the remaining structure of L and P.

This algorithm for factoring H has the following computational advantages:

The M and F matrices are lower triangular, which greatly reduces the computation in matrix operations with them, especially when N gets large.

The L and S matrices are sparse, banded matrices, which also reduces computations Many of the "square root" methods of control theory can be applied. Some of these exploit the structure within matrices A, B, C, D, Q, and R to further reduce computation.

The amount of computation required to factor H grows only linearly with N, and

The repeating structures of H and J are exploited.

FIG. 1 is a schematic of a model predictive control system 10 according to the present invention for performing the algorithm described above. The system 10 controls a plant 12 with actuators 14 based upon feedback from sensors 16 and based upon commands. The system 10 includes a desired trajectory generator 20 for generating the desired trajectory based upon the commands. The system 10 includes a quadratic programming module 21 including a module 22 for determining the various matrices and vectors of the KKT conditions in the manner described above. The KKT conditions are also functions of the current state of the system 10 based upon feedback from sensors 16. The quadratic programming module 21 further includes a module 24 for determining Hr as described above. A Modified Quadratic Programming Solver 26 follows the algorithm described above to generate actuator commands to the actuators 14 to bring about the desired state of the plant 12 and system 10.

Figure 2:
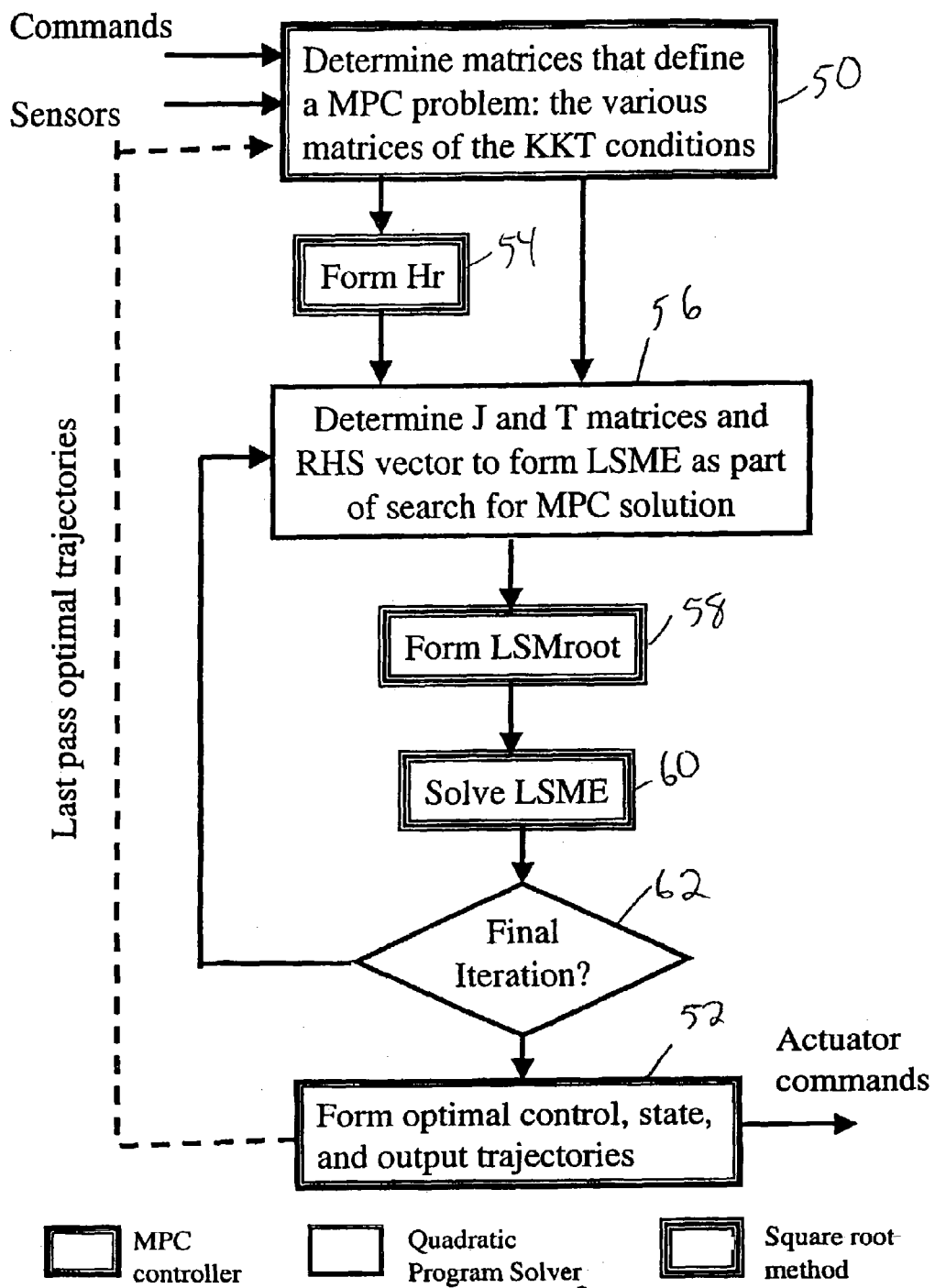
FIG. 2 is a flowchart of the method according to the present invention utilized by the system of FIG. 1.

FIG. 2 illustrates the standard way quadratic programming (QP) solvers are embedded in a Model Predictive Controller (MPC) and how the novel square root method is embedded into standard QP solvers. The algorithm of FIG. 2 is executed every controller update. Steps 50 and 52 of the figure translate model predictive control into a quadratic programming problem and extract the optimal trajectories for the next N controller updates, including the current actuator command, from the QP solution, respectively. All other steps are associated with the QP solver. General QP solvers consist of a structured, iterative search for the optimal solution that meets constraints. This consists of analyzing the solution from the prior iterate and setting up a version of the LSME (although not generally in the structured form presented here) in step 56, solving the LSME, and analyzing the results to determine if the solution has been achieved to the required accuracy in step 62. As shown in FIG. 2, the square root method adds a new logic to precompute Hr in step 54, the square root of H, before the iterative search is begun. It also replaces the solution of the LSME with a novel computationally more efficient algorithm in step 60, including forming LSMroot in step 58.

The square root method also changes the interface between the top block of FIG. 2 and the QP solver. In step 50, the commands for the system under control are received, a desired response to those commands is formulated, sensors signals indicating the current state of the system are received, and a QP problem as per the KKT conditions is formulated. The equations of the KKT condition are generally gathered into three matrix equations: one associated with the performance index, one associated with system dynamics model, and one associated with the limit conditions. The prior solution for the optimal trajectories may be used in forming the various matrices in the KKT conditions. In the standard method, the QP then forms a version of the LSME, with different structure, each iteration. In contrast, the square root method also modifies that portion of the QP solver, in step 56, in that the various variables, equations and matrices of the KKT conditions are gathered into the LSME in a specific order and structure.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for solving a Model Predictive Control problem to control a plant including the steps of:
   a) forming a Large Sparse Matrix Equation, LSME, based upon the Model Predictive Control problem;
   b) repeatedly, at least once per controller update, sampling commands and feedback sensors to pose a determination of actuator commands in terms of a solution of a quadratic programming problem based upon model predictive control;
   c) forming a square root of H, Hr, where H is a submatrix of the LSME that varies only once per controller update and Hr is a block triangular matrix in which each block along a diagonal is triangular;
   d) forming a square root of a Large Sparse Matrix of the LSME, LSMroot, using Hr in each of a plurality of iterations of a quadratic programming solver within each controller update, and LSMroot is block triangular matrix in which each block along the diagonal is triangular;
   e) completing the solution of the LSME based upon LSMroot in each iteration; and
   f) outputting the plurality of actuator commands based upon the solution of the quadratic programming problem from the quadratic programming solver in each controller update to a plurality of actuators to control operation of a plant.

2. The method of claim 1 wherein Hr is calculated in a first of the plurality of iterations and is not recalculated for subsequent ones of the plurality of iterations.

3. The method of claim 2 wherein in said step c), Hr is formed without first forming H.

4. The method of claim 3 wherein said step c) is performed with a sequence of QR factorizations.

5. The method of claim 3 where H=Hr'*S*Hr and Hr=L W$^{-T}$ where $$L = \begin{bmatrix} F_0 & & & & & & & & & \\ -M_1 B_0 & I & & & & & & & & \\ 0 & I & -M_1 & & & & & & & \\ & & 0 & G_1 & F_1 & & & & & \\ & & & -M_2 A_1 & -M_2 B_1 & I & & & & \\ & & & & 0 & I & -M_2 & & & \\ & & & & & & \ddots & \ddots & & \\ & & & & & & 0 & G_{N-1} & F_{N-1} & \\ & & & & & & & -M_N A_{N-1} & -M_N B_{N-1} & I \\ & & & & & & & & 0 & I & -M_N \end{bmatrix}$$

$$S = \begin{bmatrix} I & & & & & & & \\ -I & & & & & & & \\ & I & & & & & & \\ & & I & & & & & \\ & & & -I & & & & \\ & & & & I & & & \\ & & & & & \ddots & & \\ & & & & & & I & \\ & & & & & & -I & \\ & & & & & & & I \end{bmatrix} \quad W = \begin{bmatrix} I & & & & & & \\ & M_1 & & & & & \\ & & I & & & & \\ & & & I & & & \\ & & & & M_2 & & \\ & & & & & I & \\ & & & & & & \ddots \\ & & & & & & & I \\ & & & & & & & M_N \\ & & & & & & & & I \end{bmatrix}$$

6. The method of claim 5 where the submatrices F, G, and M are produced by the recursive sequence of QR factorizations:

$$\begin{bmatrix} Q^{1/2}C_n & Q^{1/2}D_n \\ M_nA_{n-1} & M_nB_{n-1} \\ 0 & R^{1/2} \end{bmatrix} = \text{Ortho} * \begin{bmatrix} 0 & 0 \\ M_{n-1} & 0 \\ G_{n-1} & F_{n-1} \end{bmatrix}$$

for various future controller update time points in the prediction horizon.

7. The method of claim 1 wherein the LSMroot is formed in said step d) without first forming the LSM.

8. The method of claim 7 wherein said step d) is performed by solving a normal or generalized QR factorization.

9. The method of claim 7 wherein said step d) is performed by solving a generalized QR factorization customized for an interior point method.

10. The method of claim 9 where the generalized QR factorization is $$\begin{bmatrix} 0 \\ P \end{bmatrix} = U \cdot \text{Pin}, \text{ where } \text{Pin} = \begin{bmatrix} T^{-T}J \\ L \end{bmatrix}, U^T \begin{bmatrix} I \\ & S \end{bmatrix} U = \begin{bmatrix} I \\ & S \end{bmatrix}$$

where Pin and S are inputs and triangular P and, possibly, U are outputs, and where $$LSM_{root} \equiv \begin{bmatrix} T & -T^{-T}J \\ 0 & P \end{bmatrix} \cdot \begin{bmatrix} I \\ & W^{-T} \end{bmatrix} \cdot \text{and } Sr = I.$$

11. The method of claim 7 wherein said step d) is performed by solving a generalized QR factorization customized for an active set method.

12. The method of claim 11 where the generalized QR factorization is $$S_R^{1/2}P = S^{1/2}U \cdot \text{Pin}, \text{ where } \text{Pin} = L^{-T}J^T, U^TS \cdot U = S$$

where Pin and S are inputs and P and Sr, and possibly, U are outputs and where $$LSM_{root} = \begin{bmatrix} P & 0 \\ SL^{-T}J^T & L \end{bmatrix} \begin{bmatrix} I \\ & W^{-T} \end{bmatrix}$$

13. The method of claim 12 where the generalized QR factorization is accomplished via a standard Householder transform based QR algorithm that is modified by replacing the sequence of Householder transforms $$U_i = \left( I - 2\frac{v \cdot v^T}{v^T \cdot v} \right),$$

which are normally used with a corresponding sequence of generalized transformations $$U_i = \left( I - 2\frac{v \cdot v^T S}{v^T S \cdot v} \right).$$

U is unneeded but, if desired, is the cumulative product of the Ui.

14. The method of claim 13 where the result of generalized QR factorization, which is a triangular matrix consisting of rows containing either purely real numbers or purely imaginary numbers, is further factored into the product of a diagonal matrix, $S_R^{1/2}$, which has either 1 or the square root of $-1$ on the diagonal, and a purely real triangular matrix, and wherein the square of this diagonal matrix, Sr, will then have either 1 or $-1$ on the diagonal, and Sr and P are purely real numbers.

15. The method of claim 11 further including the step of factoring the LSM to use only real numbers as:

$$LSM = LSM_{root}^T \begin{bmatrix} -S_R & 0 \\ 0 & S \end{bmatrix} LSM_{root}$$

where S and SR are constant diagonal matrices with only 1 or $-1$ entries along the diagonal, and where LSMroot is a block triangular matrix where each diagonal submatrix is also triangular.

16. The method of claim 1 wherein the LSME has the form:

$$\begin{bmatrix} -T^TT & J \\ J^T & H \end{bmatrix} \cdot \begin{bmatrix} m \\ z \end{bmatrix} = \begin{bmatrix} K \\ f \end{bmatrix}$$

where z is a vector containing states, controls and state equation adjoint variables for each time point, grouped by time; m includes adjoint variables for inequality constraints, grouped by time; f and K are vectors; H and J are banded matrices; and T is a diagonal matrix or zero.

17. The method of claim 1 further including the step of operating the plurality of actuators on the plant based upon the plurality of actuator commands, wherein the feedback sensors are measuring physical variables of the plant.

18. A method for controlling a plant including the steps of:
a) receiving a plurality of sensor signals indicating current conditions of the system;
b) receiving a plurality of commands;
c) determining a desired dynamic response of the system based upon the commands;
d) in each of a plurality of time steps, formulating a problem of achieving a desired dynamic response for a window spanning multiple time steps as a solution to a quadratic program problem using methods of model predictive control and the sensor signals;
e) solving the quadratic programming problem in each time step using an iterative algorithm in which a Large Sparse Matrix Equation, LSME, is formed based upon the model predictive control problem and a quadratic programming algorithm;
f) in a first iteration of the iterative algorithm, forming a square root of H, Hr;
g) in iterations including the first iteration and iterations subsequent to the first iteration of the iterative algorithm, forming a square root of a Large Sparse Matrix of the LSME, LSMroot, using Hr in a quadratic programming solver;

h) in iterations including the first iteration and iterations subsequent to the first iteration of the iterative algorithm, completing the solution of the LSME based upon LSMroot;

i) generating a plurality of actuator commands based upon the solution to the quadratic programming problem from said step e); and j) outputting the plurality of actuator commands to a plurality of actuators acting upon the plant.

19. A model predictive control system for controlling a plant comprising:

a plurality of sensors indicating a current state of the system;

a desired trajectory generator for creating a desired dynamic response based upon commands;

starting with a current state of the system, a quadratic programming module formulating a problem of achieving the desired dynamic response based upon the current state of the system for a window spanning multiple time steps as a solution to a quadratic program problem using methods of model predictive control;

a quadratic programming solver solving the quadratic programming problem in each time step using an iterative algorithm in which a Large Sparse Matrix Equation, LSME, is formed based upon the model predictive control problem and a quadratic programming algorithm, the solver forming a square root of H, Hr, in a first iteration of the iterative algorithm, the solver forming a square root of a Large Sparse Matrix of the LSME, LSMroot, using Hr in a quadratic programming solver in iterations including the first iteration and a plurality of iterations subsequent to the first iteration of the iterative algorithm, the solver completing the solution of the LSME based upon LSMroot in iterations including the first iteration and the plurality of iterations subsequent to the first iteration of the iterative algorithm, the solver outputting a plurality of actuator commands for achieving the desired dynamic response based upon the solution to the quadratic programming problem to control a plant.

20. The system of claim 19 wherein the solver forms Hr in the first iteration and does not recalculate Hr in the plurality of iterations subsequent to the first iteration of the iterative algorithm.

21. The system of claim 20 wherein the solver forms Hr without first forming H.

22. The system of claim 21 wherein $H=Hr'*S*Hr$ and $Hr=L\,W^{-T}$ where $$L = \begin{bmatrix} F_0 & & & & & & & & & & \\ -M_1 B_0 & I & & & & & & & & & \\ 0 & I & -M_1 & & & & & & & & \\ & 0 & G_1 & F_1 & & & & & & & \\ & & -M_2 A_1 & -M_2 B_1 & I & & & & & & \\ & & & 0 & I & -M_2 & & & & & \\ & & & & & \ddots & \ddots & & & & \\ & & & & & & 0 & G_{N-1} & F_{N-1} & & \\ & & & & & & & -M_N A_{N-1} & -M_N B_{N-1} & I & \\ & & & & & & & & 0 & I & -M_N \end{bmatrix}$$

$$S = \begin{bmatrix} I & & & & & & & & \\ & -I & & & & & & & \\ & & I & & & & & & \\ & & & I & & & & & \\ & & & & -I & & & & \\ & & & & & I & & & \\ & & & & & & \ddots & & \\ & & & & & & & I & \\ & & & & & & & & -I \\ & & & & & & & & & I \end{bmatrix} \quad W = \begin{bmatrix} I & & & & & & & \\ & M_1 & & & & & & \\ & & I & & & & & \\ & & & I & & & & \\ & & & & M_2 & & & \\ & & & & & I & & \\ & & & & & & \ddots & \\ & & & & & & & I \\ & & & & & & & & M_N \\ & & & & & & & & & I \end{bmatrix}$$

23. The system of claim 22 where the submatrices F, G, and M are produced by the recursive sequence of QR factorizations:

$$\begin{bmatrix} Q^{1/2} C_n & Q^{1/2} D_n \\ M_n A_{n-1} & M_n B_{n-1} \\ 0 & R^{1/2} \end{bmatrix} = Ortho * \begin{bmatrix} 0 & 0 \\ M_{n-1} & 0 \\ G_{n-1} & F_{n-1} \end{bmatrix}$$

for various future controller update time points in the prediction horizon.

24. The system of claim 19 wherein the solver forms LSMroot without first forming the LSM.

25. The system of claim 24 wherein the solver forms the LSMroot by solving a normal or generalized QR factorization.

26. The system of claim 24 wherein the solver forms the LSMroot by solving a generalized QR factorization customized for an interior point method.

27. The system of claim 26 where the generalized QR factorization is $$\begin{bmatrix} 0 \\ P \end{bmatrix} = U \cdot Pin, \text{ where } Pin = \begin{bmatrix} T^{-T}J \\ L \end{bmatrix}, U^T \begin{bmatrix} I \\ & S \end{bmatrix} U = \begin{bmatrix} I \\ & S \end{bmatrix}$$

where Pin and S are inputs and triangular P and, possibly, U are outputs, and where $$LSM_{root} \equiv \begin{bmatrix} T & -T^{-T}J \\ 0 & P \end{bmatrix} \cdot \begin{bmatrix} I \\ & W^{-T} \end{bmatrix} \cdot \text{ and } Sr = I.$$

28. The system of claim 24 wherein the solver forms LSMroot by solving a generalized QR factorization customized for an active set method.

29. The system of claim 28 where the generalized QR factorization is $$S_R^{1/2} P = S^{1/2} U \cdot Pin, \text{ where } Pin = L^{-T}J^T, U^T S \cdot U = S$$

where Pin and S are inputs and P and Sr, and possibly, U are outputs and where $$LSM_{root} = \begin{bmatrix} P & 0 \\ SL^{-T}J^T & L \end{bmatrix} \begin{bmatrix} I \\ & W^{-T} \end{bmatrix}$$

30. The system of claim 29 where the generalized QR factorization is accomplished via a standard Householder transform based QR algorithm that is modified by replacing the sequence of Householder transforms $$U_i = \left(I - 2\frac{v \cdot v^T}{v^T \cdot v}\right),$$

which are normally used with a corresponding sequence of generalized transformations $$U_i = \left(I - 2\frac{v \cdot v^T S}{v^T S \cdot v}\right).$$

U is unneeded but, if desired, is the cumulative product of the Ui.

31. The system of claim 30 where the result of generalized QR factorization, which is a triangular matrix consisting of rows containing either purely real numbers or purely imaginary numbers, is further factored into the product of a diagonal matrix, $S_R^{1/2}$, which has either 1 or the square root of $-1$ on the diagonal, and a purely real triangular matrix and wherein a square of this diagonal matrix, Sr, will then have either 1 or $-1$ on the diagonal, and Sr and P are purely real numbers.

32. The system of claim 28 wherein the solver factors the LSM to use only real numbers as:

$$LSM = LSM_{root}^T \begin{bmatrix} -S_R & 0 \\ 0 & S \end{bmatrix} LSM_{root}$$

where S and SR are constant diagonal matrices with only 1 or $-1$ entries along the diagonal, and where LSMroot is a block triangular matrix where each diagonal submatrix is also triangular.

33. The system of claim 19 wherein the LSME has the form:

$$\begin{bmatrix} -T^T T & J \\ J^T & H \end{bmatrix} \cdot \begin{bmatrix} m \\ z \end{bmatrix} = \begin{bmatrix} K \\ f \end{bmatrix}$$

where z is a vector containing states, controls and state equation adjoint variables for each time point, grouped by time; m includes adjoint variables for inequality constraints, grouped by time; f and K are vectors; H and J are banded matrices; and T is a diagonal matrix or zero.

34. The system of claim 19 further including a plurality of actuators acting upon the plant based upon the plurality of actuator commands to effect the desired dynamic response.

* * * * *